(12) United States Patent
Brandt

(10) Patent No.: US 9,661,267 B2
(45) Date of Patent: May 23, 2017

(54) VIDEOCONFERENCING SYSTEM DISCOVERY

(75) Inventor: Matthew K. Brandt, Driftwood, TX (US)

(73) Assignee: Lifesize, Inc., Austin, TX (US)

( * ) Notice: Subject to any disclaimer, the term of this patent is extended or adjusted under 35 U.S.C. 154(b) by 2480 days.

(21) Appl. No.: 11/858,342

(22) Filed: Sep. 20, 2007

(65) Prior Publication Data

US 2009/0079811 A1  Mar. 26, 2009

(51) Int. Cl.
*H04N 7/15* (2006.01)
*H04N 7/14* (2006.01)

(52) U.S. Cl.
CPC ............ *H04N 7/148* (2013.01); *H04N 7/15* (2013.01)

(58) Field of Classification Search
USPC ......... 348/14.08, 14.09, 14.01, 14.02, 14.03, 348/14.07, 14.1; 709/204–206; 379/221.01; 455/404.2, 414.1, 416, 455/414.2, 414.3, 415
See application file for complete search history.

(56) References Cited

U.S. PATENT DOCUMENTS

| | | | |
|---|---|---|---|
| 5,077,732 A | 12/1991 | Fischer et al. | |
| 5,276,681 A | 1/1994 | Tobagi et al. | |
| 5,365,265 A | 11/1994 | Shibata et al. | |
| 5,374,952 A | 12/1994 | Flohr | |
| 5,381,413 A | 1/1995 | Tobagi et al. | |
| 5,392,223 A | 2/1995 | Caci | |
| 5,446,735 A | 8/1995 | Tobagi et al. | |
| 5,491,797 A | 2/1996 | Thompson et al. | |
| 5,530,472 A | 6/1996 | Bregman et al. | |
| 5,550,982 A | 8/1996 | Long et al. | |
| 5,568,183 A | 10/1996 | Cortjens et al. | |

(Continued)

FOREIGN PATENT DOCUMENTS

EP  1515515 A1  3/2005
WO  99/53719  10/1999

OTHER PUBLICATIONS

U.S. Appl. No. 60/761,867, entitled "Shared Conference Participant Data", by Michael L. Kenoyer, filed Jan. 24, 2006. 98 pages.

(Continued)

*Primary Examiner* — Davetta W Goins
*Assistant Examiner* — Jasmine Pritchard
(74) *Attorney, Agent, or Firm* — Meyertons, Hood, Kivlin, Kowert & Goetzel, P.C.

(57) ABSTRACT

System and method for discovering videoconferencing systems. A first videoconferencing system may contact a known second videoconferencing system. The first videoconferencing system may receive contact information of one or more other videoconferencing systems from the second videoconferencing system. The first videoconferencing system may send a request signal to a third videoconferencing system of the one or more other videoconferencing systems. The request signal may use the contact, wherein the first videoconferencing system sending the request signal uses the contact information of the third videoconferencing system. The first videoconferencing system may receive a response from the third videoconferencing system, and the response may include information regarding the third videoconferencing system.

25 Claims, 9 Drawing Sheets

(56) References Cited

U.S. PATENT DOCUMENTS

| | | | |
|---|---|---|---|
| 5,572,583 A | 11/1996 | Wheeler et al. | |
| 5,592,477 A | 1/1997 | Farris et al. | |
| 5,617,539 A | 4/1997 | Ludwig et al. | |
| 5,642,156 A | 6/1997 | Saiki | |
| 5,657,096 A | 8/1997 | Lukacs | |
| 5,689,553 A | 11/1997 | Ahuja et al. | |
| 5,689,641 A * | 11/1997 | Ludwig | G06Q 10/10 348/14.08 |
| 5,737,011 A | 4/1998 | Lukacs | |
| 5,751,338 A | 5/1998 | Ludwig, Jr. | |
| 5,764,277 A | 6/1998 | Loui et al. | |
| 5,859,979 A | 1/1999 | Tung et al. | |
| 5,867,495 A | 2/1999 | Elliott et al. | |
| 5,892,767 A | 4/1999 | Bell et al. | |
| 5,896,128 A | 4/1999 | Boyer | |
| 5,903,302 A | 5/1999 | Browning et al. | |
| 5,914,940 A | 6/1999 | Fukuoka et al. | |
| 5,940,372 A | 8/1999 | Bertin et al. | |
| 6,043,844 A | 3/2000 | Bist et al. | |
| 6,108,687 A | 8/2000 | Craig | |
| 6,147,988 A | 11/2000 | Bartholomew et al. | |
| 6,167,432 A * | 12/2000 | Jiang | H04L 12/1818 709/203 |
| 6,216,173 B1 | 4/2001 | Jones et al. | |
| 6,240,140 B1 | 5/2001 | Lindbergh et al. | |
| 6,262,978 B1 | 7/2001 | Bruno et al. | |
| 6,353,681 B1 | 3/2002 | Nagai et al. | |
| 6,357,028 B1 | 3/2002 | Zhu | |
| 6,477,248 B1 | 11/2002 | Bruhnke et al. | |
| 6,480,823 B1 | 11/2002 | Zhao et al. | |
| 6,583,806 B2 * | 6/2003 | Ludwig | G06Q 10/10 348/14.07 |
| 6,594,688 B2 | 7/2003 | Ludwig et al. | |
| 6,621,515 B2 | 9/2003 | Matthews et al. | |
| 6,633,324 B2 | 10/2003 | Stephens, Jr. | |
| 6,633,985 B2 | 10/2003 | Drell | |
| 6,674,457 B1 | 1/2004 | Davies et al. | |
| 6,693,661 B1 | 2/2004 | Vanderwilt et al. | |
| 6,704,769 B1 | 3/2004 | Comstock et al. | |
| 6,714,635 B1 | 3/2004 | Adams et al. | |
| 6,757,005 B1 | 6/2004 | Elbaz et al. | |
| 6,774,928 B2 | 8/2004 | Bruzzone | |
| 6,785,246 B2 * | 8/2004 | Foti | H04L 12/1818 370/261 |
| 6,816,904 B1 | 11/2004 | Ludwig et al. | |
| 6,909,708 B1 | 6/2005 | Krishnaswamy et al. | |
| 6,975,721 B1 | 12/2005 | Nimri et al. | |
| 7,009,943 B2 | 3/2006 | O'Neil | |
| 7,016,341 B2 | 3/2006 | Potter et al. | |
| 7,023,465 B2 * | 4/2006 | Stephens, Jr. | H04L 12/1818 348/14.09 |
| 7,043,749 B1 | 5/2006 | Davies | |
| 7,051,049 B2 | 5/2006 | Samn | |
| 7,054,933 B2 | 5/2006 | Baxley et al. | |
| 7,081,827 B2 | 7/2006 | Addy | |
| 7,082,402 B2 | 7/2006 | Conmy et al. | |
| 7,174,365 B1 | 2/2007 | Even | |
| 7,353,251 B1 * | 4/2008 | Balakrishnan | 709/204 |
| 7,426,193 B2 * | 9/2008 | Roher et al. | 370/261 |
| 7,461,126 B2 * | 12/2008 | Berkeland et al. | 709/204 |
| 8,125,508 B2 | 2/2012 | Kenoyer | |
| 8,441,516 B2 * | 5/2013 | Satyanarayanan | H04L 12/1822 348/14.08 |
| 9,325,749 B2 * | 4/2016 | Bangor | H04L 12/1818 |
| 2002/0152440 A1 | 10/2002 | Yona et al. | |
| 2002/0159394 A1 | 10/2002 | Decker et al. | |
| 2002/0186243 A1 * | 12/2002 | Ellis | G06F 19/3418 715/753 |
| 2002/0188731 A1 | 12/2002 | Potekhin et al. | |
| 2003/0028526 A1 | 2/2003 | Fitzpatrick et al. | |
| 2003/0058836 A1 | 3/2003 | Even | |
| 2003/0078981 A1 | 4/2003 | Harms et al. | |
| 2003/0088619 A1 * | 5/2003 | Boundy | H04L 29/06 709/204 |
| 2003/0174146 A1 | 9/2003 | Kenoyer | |
| 2004/0028035 A1 | 2/2004 | Read | |
| 2004/0037268 A1 | 2/2004 | Read | |
| 2004/0042553 A1 | 3/2004 | Elbaz et al. | |
| 2004/0114612 A1 | 6/2004 | Even et al. | |
| 2004/0183897 A1 | 9/2004 | Kenoyer et al. | |
| 2005/0071427 A1 | 3/2005 | Dorner et al. | |
| 2005/0198134 A1 | 9/2005 | Kenoyer et al. | |
| 2005/0204007 A1 | 9/2005 | McGregor et al. | |
| 2006/0083182 A1 | 4/2006 | Tracey | |
| 2006/0087987 A1 | 4/2006 | Witt et al. | |
| 2006/0106929 A1 | 5/2006 | Kenoyer | |
| 2006/0133354 A1 * | 6/2006 | Lee | H04L 29/12509 370/352 |
| 2006/0256738 A1 | 11/2006 | Kenoyer | |
| 2007/0116213 A1 * | 5/2007 | Gruchala | H04M 1/57 379/100.01 |
| 2007/0168529 A1 | 7/2007 | Taylor et al. | |
| 2008/0068447 A1 * | 3/2008 | Mattila | H04N 7/15 348/14.08 |
| 2009/0012373 A1 * | 1/2009 | Raij | G06Q 50/22 600/300 |
| 2012/0176467 A1 * | 7/2012 | Kenoyer | 348/14.08 |
| 2014/0085403 A1 * | 3/2014 | Ryan | G06F 19/3418 348/14.07 |

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Louis C. Yun and David G. Messerschmitt; "Architectures for Multi-Source Multi-User Video Compositing"; 1993; 9 pages; University of California at Berkley, Berkley CA.

"Conferencing Service Provision—How Ridgeway IP Freedom Helps the CSP"; 2002; 4 pages; Ridgeway Systems and Software Ltd.

"Deploying H.323 Conferencing on Your IP Network—Seeing, Hearing, and Sharing Across Networks"; First Virtual Communications Technical White Paper; 2000; 11 pages.

"Eye-to-Eye Video"; Retrieved from the Internet: http://itotd.com/articles/254/eye-to-eye-video/; Jul. 23, 2004; 6 pages.

"H.264 FAQ"; Retrieved from the Internet: http://www.apple.com/mpeg4/h264faq.html; 2005; 2 pages.

"IPfreedom—Enabling end-to-end IP Voice (VoIP) and Video communications by securely traversing firewalls and NATs"; Glowpoint Case Study; 2003; 4 pages; Ridgeway Systems & Software, Inc.

Victor Paulsamy and Samir Chatterjee; "Network Convergence and the NAT/Firewall Problems"; Proceedings of the 36th Hawaii International Conference on System Sciences; Jan. 2003; 10 pages.

"Personal videoconferencing from the desktop is better than ever" http://web.archive.org/web/20041009174345/www.wireone.com/products_desktop.php (web archive dated Oct. 9, 2004) (Copyright 2003); 2 pages.

"Radvision Firewall Cookbook"; Manual; Jan. 2002; 26 pages; Radvision.

Ira M. Weinstein; "Security for Videoconferencing: A guide to understanding, planning, and implementing secure compliant ISDN & IP videoconferencing solutions"; Jan.-Feb. 2004; 16 pages; Wainhouse Research.

"Traversing Firewalls and NATs With Voice and Video Over IP"; Whitepaper; Apr. 2002; 14 pages; Wainhouse Research, LLC & Ridgeway Systems and Software, Inc.

(56) References Cited

OTHER PUBLICATIONS

"Traversing Firewalls with Video over IP: Issues and Solutions" VCON Visual Communications, Whitepaper, Aug. 2003; 8 pages.
"V-Span" (http://web.archive.org/web/20040806213948/www.vspan.com/html/managedservices/vbm/index.html) (web archive dated Aug. 6, 2004); 2 pages.
E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.
E. J. Addeo, A.D. Gelman and A.B. Dayao; "Personal Multi-media Multi-point Communication Services for Broadband Networks", Global Telecommunications Conference and Exhibition; Nov.-Dec. 1988 pp. 53-57; vol. 1.
Elan Amir, Steven McCann E and Randy Katz; "Receiver-driven Bandwidth Adaptation for Light-weight Sessions"; Proceedings of the fifth ACM international conference on Multimedia; 1997; pp. 415-426; Berkeley, CA.
"Procedures for establishing communication between three or more audiovisual terminals using digital channels up to 1920 kbit/s" ITU-T H.243 (Feb. 2000); International Telecommunication Union; 62 pages; Geneva, Switzerland.
"Multipoint control units for audiovisual systems using digital channels up to 1920 kbit/s"; ITU-T H.231 (Jul. 1997) International Telecommunication Union; 21 pages.
"Polycom Executive Collection"; Jun. 2003; 4 pages; Polycom, Inc.; Pleasanton, CA.
E. F. Brown, J. O. Limb and B. Prasada; "A Continuous Presence Video Conferencing System"; National Telecommunications Conference Record; Dec. 1978; 5 pages; vol. 1.
Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.
P. Galvez, H. Newman, C. Isnard and G. Denis; "Networking, Videoconferencing and Collaborative Environments"; Computer Physics Communications; May 1998; vol. 110, Issue 1-3; 13 pages.
Tohru Hoshi, Kenjiro Mori, Yasuhiro Takahashi Yoshiyuki Nakayama, and Takeshi Ishizaki; "B-Video ISDN Multimedia Communication and Collaboration Platform Using Advanced Video Waterstations to Support Cooperative Work"; IEEE Journal on Selected Areas in Communications; Dec. 1992; pp. 1403-1412; vol. 10, No. 9.
A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.
Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.
Aurel A. Lazar, Koon-Seng Lim and Franco Marconcini; "xbind: The System Programmer's Manual"; Technical Report; Jun. 1996; 69 pages; Center for Telecommunications Research; Columbia University, New York.
Michael E. Lukacs; "The Personal Presence System—Hardware Architecture", Proceedings of the Second ACM International Conference on Multimedia; Oct. 1994; pp. 69-76; Bell Communications Research.
Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.
Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.
Steven McCanne; "Scalable Multimedia Communication with Internet Multicast, Light-weight Sessions, and the Mbone"; 1998; 32 pages; University of California Berkeley.
Leysia Palen; "Social, Individual and Technological Issues for Groupware Calendar Systems" Conference on Human Factors in Computing Systems; 1999; pp. 17-24.
Roderick E. Perkins; "Spider: Investigation in Collaborative Technologies and Their Effects on Network Performance"; Global Telecommunications Conference; Dec. 1991; pp. 2074-2080; vol. 3.
Wilko Reinhardt; "Advance Reservation of Network Resources for Multimedia Applications"; Proceedings of the Second International Workshop on Multimedia: Advanced Teleservices and High-Speed Communication Architectures; 1994; pp. 23-33.
Shaker Sabri and Birendra Prasada; "Video Conferencing Systems"; Proceedings of the IEEE; Apr. 1985; pp. 671-688; vol. 74, Issue 4.
Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.
"How Glowpoint Works", http://web.archive.org/web/20031008073034/www.glowpoint.com/pages/about/how.html, web archive dated Oct. 8, 2003; 1 page.
Aurel A. Lazar and Koon-Seng Lim; "Programmability and Service Creation for Multimedia Networks"; Fifth IEEE International Symposium on High Performance Distributed Computing; 1996; pp. 217-223.
Elan Amir, Steven McCanne, and Hui Zhang; "An Application Level Video Gateway"; In Proceedings of ACM Multimedia '95; 1995; 18 pages.
"Tunnel: A simple UDP/TCP tunnel application"; www.tunnel.mrq3.com from web archive: http://web.archive.org/web/20040901071149/http://tunnel.mrq3.com/, dated 2004; 2 pages.
Apple Computer, Inc. "Apple 'Open Sources' Rendevous," Press Release, Sep. 25, 2002, Cupertino, California, Apple.com.
Stephan Somogyi, "Apple's Rendezvous: What it is and why it matters," Article, Aug. 28, 2002, CNET Networks, Inc., online at http://review.zdnet.com/4520-6033_16-4207554.html.
"Inside Macintosh: Networking With Open Transport / Part 1—Open Transport Essentials / Chapter 13—AppleTalk Addressing", Apple Developer Connection, Apple Computer, Inc., Jan. 15, 1998, http://developer.apple.com/documentation/mac/NetworkingOT/NetworkingWOT-62.html.
"Skype Simplifies for New Users", Skype Limited, Luxembourg, Mar. 23, 2005, http://about.skype.com/2005/03/skype_simplifies_for_new_users.html.
"Bonjour—Connect Computers and Electronic Devices Automatically Without Any Configuration", Apple Computer, 2005, 6 pages.

* cited by examiner

FIG. 9C

VIDEOCONFERENCING SYSTEM DISCOVERY

FIELD OF THE INVENTION

The present invention relates generally to conferencing and, more specifically, to discovery of videoconferencing endpoints.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker to reproduce video and audio received from a remote participant. Each videoconferencing system may also be coupled to a computer system to allow additional functionality into the videoconference. For example, additional functionality may include data conferencing (including displaying and/or modifying a document for both participants during the conference).

One problem with current videoconferencing systems is that there is no easy way to discover other videoconferencing users (or endpoints) to which communication may be desired.

SUMMARY OF THE INVENTION

Various embodiments of a method for discovering videoconferencing systems are described.

A first videoconferencing system may contact (or send an inquiry to) a known second videoconferencing system or may contact an unknown second video conferencing systems by use of a broadcast or multicast mechanism. The first videoconferencing system may contact the known second videoconferencing host for a variety of reasons. For example, the first videoconferencing system may contact known or discovered videoconferencing systems each time the first videoconferencing system is started. Alternatively, the signal may be sent to the second videoconferencing system based on a timer, or at various intervals to determine a status of the second videoconferencing system.

The first videoconferencing system may contact the second video conferencing unit via a variety of methods. In one embodiment, the first videoconferencing system may contact the second videoconferencing system using one or more signals. For example, the first videoconferencing system may contact the second videoconferencing system by sending one or more packets over a local or wide area network (e.g., the Internet). In one embodiment, the first videoconferencing system may send an inquiry (ENQ) packet to the second videoconferencing system. The signal(s)/packet(s) sent to the second videoconferencing system may include various information. For example, the signal(s) may include a station name (e.g., of the first videoconferencing system), information regarding users that use the first videoconferencing system (e.g., names, addresses, locations, phone numbers, email addresses, etc.), information regarding the company name that owns or operates the first videoconferencing system (e.g., names, addresses, locations, phone numbers, email addresses, etc.), an IPv4 Address/Mask, an IPv6 Address, a station capability string, a list of known videoconferencing systems (e.g., in the destination subnet and/or otherwise), a list of possible or suspected videoconferencing systems, a list of unresponsive videoconferencing systems, and/or other information.

The first videoconferencing system may store information regarding videoconferencing systems. The first videoconferencing system may store a single data structure (a list or database) of information regarding videoconferencing systems, or may store a plurality of separate data structures (lists or databases). For example, the videoconferencing system may store a plurality of lists (data structures) and place videoconferencing systems in the different lists according to various states. In one embodiment, the videoconferencing system may store a list of known or discovered videoconferencing systems, a list of unresponsive videoconferencing systems, a list of "suspects" or possible videoconferencing systems, and/or other lists of videoconferencing systems. The list of known or discovered videoconferencing systems may be used as the address book or may be used to populate a separate address book. Alternatively, or additionally, the videoconferencing system may simply store a single file or database of videoconferencing systems, but may change the state or status of the videoconferencing systems (e.g., as discovered, suspected (or possible), non-responsive, etc.) based on various time intervals, responses, signals, etc. (described in more detail herein). Note that references to storing videoconferencing systems in various ones of the lists may correspond to storing them in a single list or database and changing states in the list (or database), as well as storing them in multiple separate lists. In the example above, the first videoconferencing system may store information regarding the second videoconferencing system in one of the lists, such as the known list, or in another implementation may be stored in a single comprehensive list with a status of "known". As used herein, the term "list" is used to refer generically to a data structure stored in memory of a computer system that stores information regarding videoconferencing systems.

In some embodiments, the stored information regarding other videoconferencing systems may be displayed to the user in a graphical user interface, e.g., of a videoconferencing program executing on the videoconferencing system. In one embodiment, at least some of the stored information may be displayed in an address book. The address book may include recently contacted videoconferencing systems (e.g., the last 1, 2, 3, 5, 10, 15, 20, etc.), intra-corporate contacts (e.g., found in the company's local area network), business contacts (e.g., contacts of the company), personal contacts (e.g., contacts personal to the user of the videoconferencing systems), discovered contacts (e.g., videoconferencing systems found via discovery), possible contacts (e.g., unconfirmed discovered videoconferencing systems), private contacts (e.g., contacts that should not be shared with other videoconferencing systems, e.g., during discovery) and/or other types of contacts. These different categories may be displayed to the user in various organizations (e.g., according to the categories above or other categories, e.g., as defined by the user). In some embodiments, the user may be able to manually sort or configure the address book to personal tastes. Additionally, or alternatively, the videoconferencing program may automatically sort or organize the address book as desired. Updates to the stored information (e.g., in one or more address files or paths) may be displayed in the address book in the videoconferencing application.

The first videoconferencing system may receive contact information (e.g., "hints") of one or more other videoconferencing systems from the second videoconferencing system (e.g., stored in the address book of the second videoconferencing system). In one embodiment, the first videoconferencing system may receive the contact information from the second videoconferencing system in one or more signals or packets from the second videoconferencing system. For example, the second videoconferencing system may respond to the ENQ packet of 302 with an acknowledge (ACK) packet.

The response (e.g., the ACK packet) may include similar information as the ENQ packet described above (except with respect to the second videoconferencing system instead of the first). More specifically, the response may include information regarding addresses of the one or more other videoconferencing systems. These videoconferencing systems may be in and/or outside of the local network of the first and/or second videoconferencing system.

However, it should be noted that the contact information provided by the second videoconferencing system may be filtered, e.g., according to various criteria/settings of the second videoconferencing system. For example, the second videoconferencing system may not send contact information of certain ones of its known or possible videoconferencing systems to the first videoconferencing system based on various criteria. In one embodiment, the criteria may include a privacy flag (e.g., indicating that a particular videoconferencing system's contact information should not be shared to other videoconferencing systems (in this case, the first videoconferencing system)), a whitelist for sharing information (e.g., according to network addresses and/or name criteria), a blacklist for not sharing information (e.g., according to network addresses and/or name criteria), a criteria to share or not share videoconferencing systems within the same network (e.g., a subnet), a criteria to share or not share videoconferencing systems outside of the local network, and/or other information. In one embodiment, the second videoconferencing system may not provide information and/or respond to the first videoconferencing system unless consent has been given by the operator of the second videoconferencing system and/or the videoconferencing system of which the second videoconferencing system is providing information.

The first videoconferencing system may compare the one or more conferencing units to its own lists of videoconferencing systems. For example, the first videoconferencing system may eliminate or ignore any of the one or more videoconferencing systems that the first videoconferencing system is already aware of. However, for those conferencing units that the first conferencing unit is not aware of, the first videoconferencing system may update stored information. In one embodiment, the first videoconferencing system may add all unknown videoconferencing systems to its possible videoconferencing or "suspects" list. However, as noted above, the first videoconferencing system may filter some of the received videoconferencing systems according to various criteria, such as white or black lists (e.g., of network addresses or subnets, among others), intelligent filtering, categories of contacts, etc.

Additionally, the first videoconferencing system may add all of the videoconferencing systems that are currently unresponsive (as indicated by the second videoconferencing system) to an unresponsive list. In other words, the second videoconferencing system may transmit a list of unresponsive videoconferencing systems (e.g., in addition to its known contacts), and the first videoconferencing systems may move all discovered or known videoconferencing systems that match the unresponsive videoconferencing systems to an unresponsive list. Thus, videoconferencing system information may be updated or stored based on the information transmitted to the first videoconferencing system by the second videoconferencing system. This update may occur at various times, as desired.

The first videoconferencing system may send a request signal to a third videoconferencing system of the one or more other videoconferencing systems. To send the request, the first videoconferencing system may use the contact information of the third videoconferencing system received from the second videoconferencing system. The request signal may be similar to the signal sent by the first videoconferencing system to the second videoconferencing system. For example, the request signal may be one or more ENQ packets. In one embodiment, ENQ packets may be sent to each videoconferencing system in the possible list (including, in this case, the third conferencing unit) periodically for a period of time. For example, ENQ packet(s) may be sent every five seconds for thirty seconds.

The first videoconferencing system may receive a response from the third videoconferencing system. The response may include information regarding the third videoconferencing system. In one embodiment, the response from the third videoconferencing system may be similar to the response of the second videoconferencing. For example, the third videoconferencing system may respond with information (e.g., in ACK packet(s)) similar to the information described above (e.g., addresses, capabilities, contact information, user information, etc.). Thus, the third videoconferencing may respond to the request from the first videoconferencing system.

The first videoconferencing system may update stored information regarding videoconferencing systems. For example, where the third videoconferencing system responds (e.g., within a predetermined length of time, such as, for example, 30 seconds), the first videoconferencing system may store the third videoconferencing system (e.g., information regarding the third videoconferencing system) in a discovered or known videoconferencing systems list. Correspondingly, the third videoconferencing system may be removed from an unresponsive or possible ("suspected") list. Thus, the first videoconferencing system may discover (or automatically discover as desired) the third videoconferencing system by contacting a known videoconferencing system (in this case the second videoconferencing system). However, where the third videoconferencing system does not respond, the third videoconferencing system may be added to an unresponsive list and/or other videoconferencing systems may be notified of the third videoconferencing system's unresponsive state.

BRIEF DESCRIPTION OF THE DRAWINGS

A better understanding of the present invention may be obtained when the following detailed description is considered in conjunction with the following drawings, in which:

FIGS. 9A-9D are exemplary screen shots corresponding to FIGS. 3-8, according to some embodiments.

Figure 1:
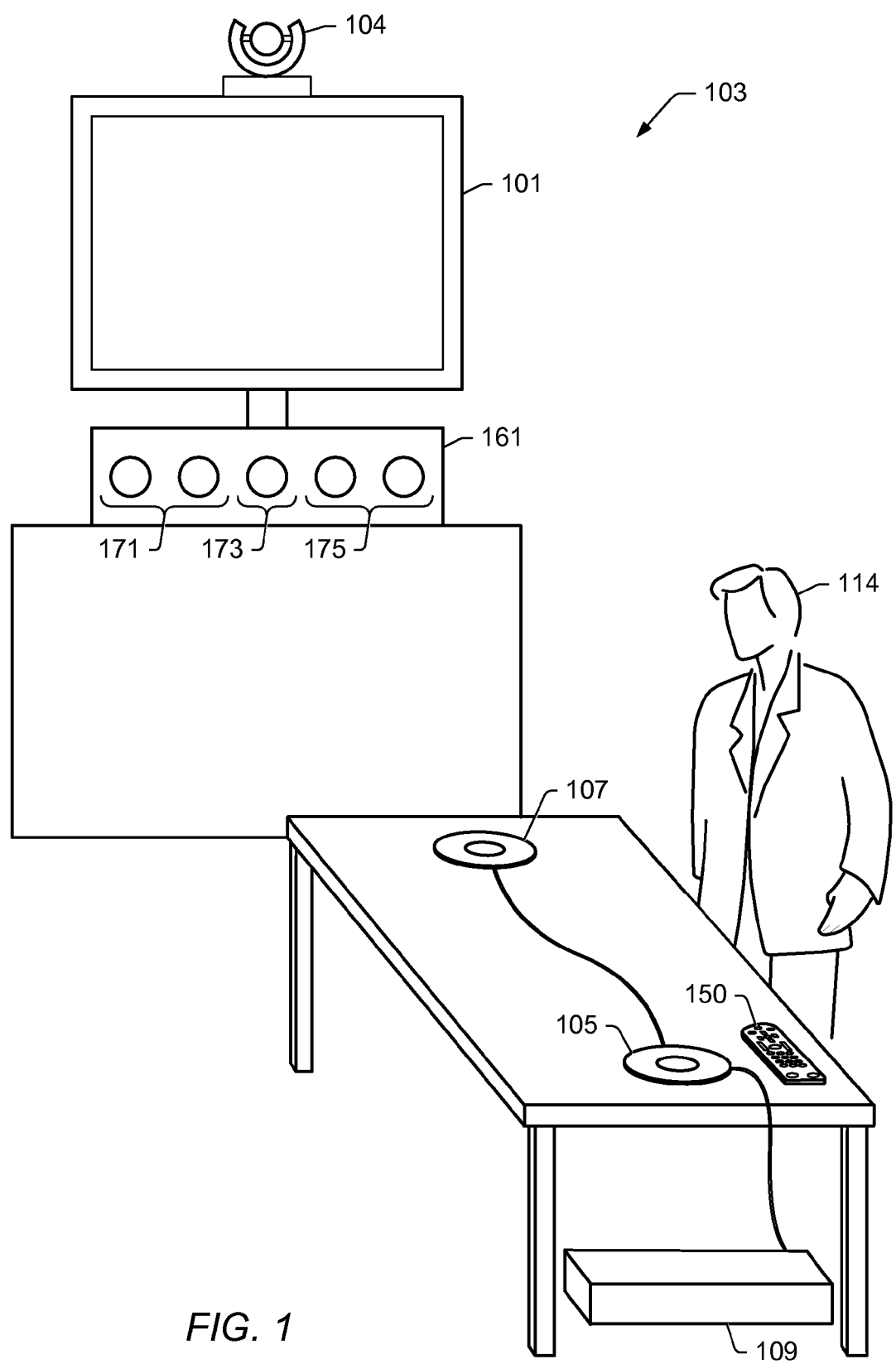
FIG. 1 illustrates a videoconferencing system participant location, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Patent Application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. Patent Application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

FIG. 1—Exemplary Participant Location

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include a display 201 (e.g., an HDTV display). Images acquired by the camera 104 may be displayed locally on the display 101 and may also be encoded and transmitted to other participant locations in the videoconference.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant through the user input components (e.g., buttons) on the speakerphones 105/107 and/or remote control 150. Other system interfaces may also be used.

In various embodiments, a codec may implement a real time transmission protocol. In some embodiments, a codec (which may mean short for "compressor/decompressor") may comprise any system and/or method for encoding and/or decoding (e.g., compressing and decompressing) data (e.g., audio and/or video data). For example, communication applications may use codecs to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with a network infrastructures that support T1 capabilities or less, e.g., 1.5 mega-bits per second or less in one embodiment, and 2 mega-bits per second in other embodiments.

Note that the videoconferencing system(s) performing the automatic discovery described herein, and/or the systems being discovered, (e.g., the videoconferencing codec 109) may be a dedicated videoconferencing system (i.e., whose purpose is to provide videoconferencing) or a general purpose computer (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

Figure 9A:
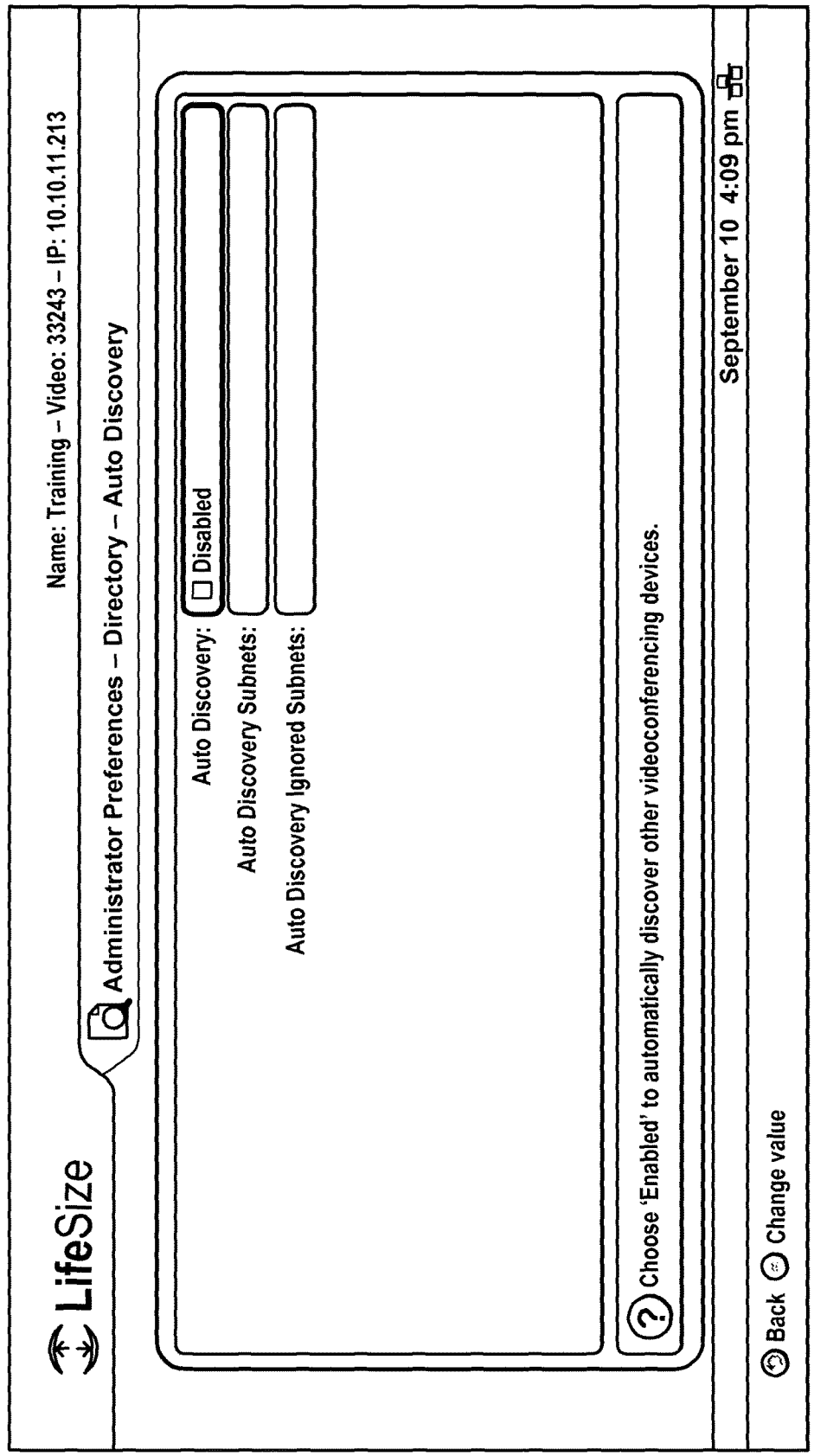
Figure 9B:
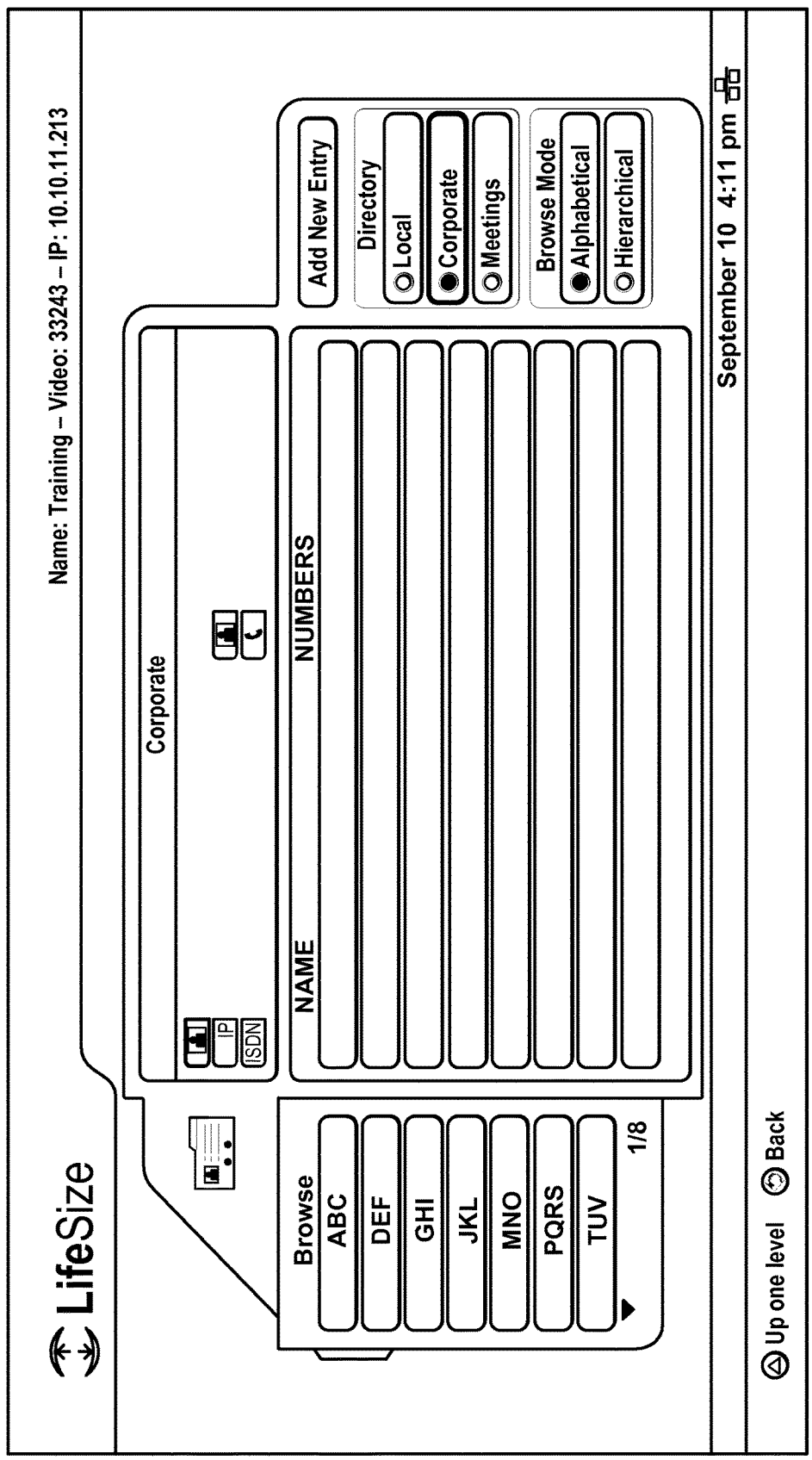
Figure 9C:
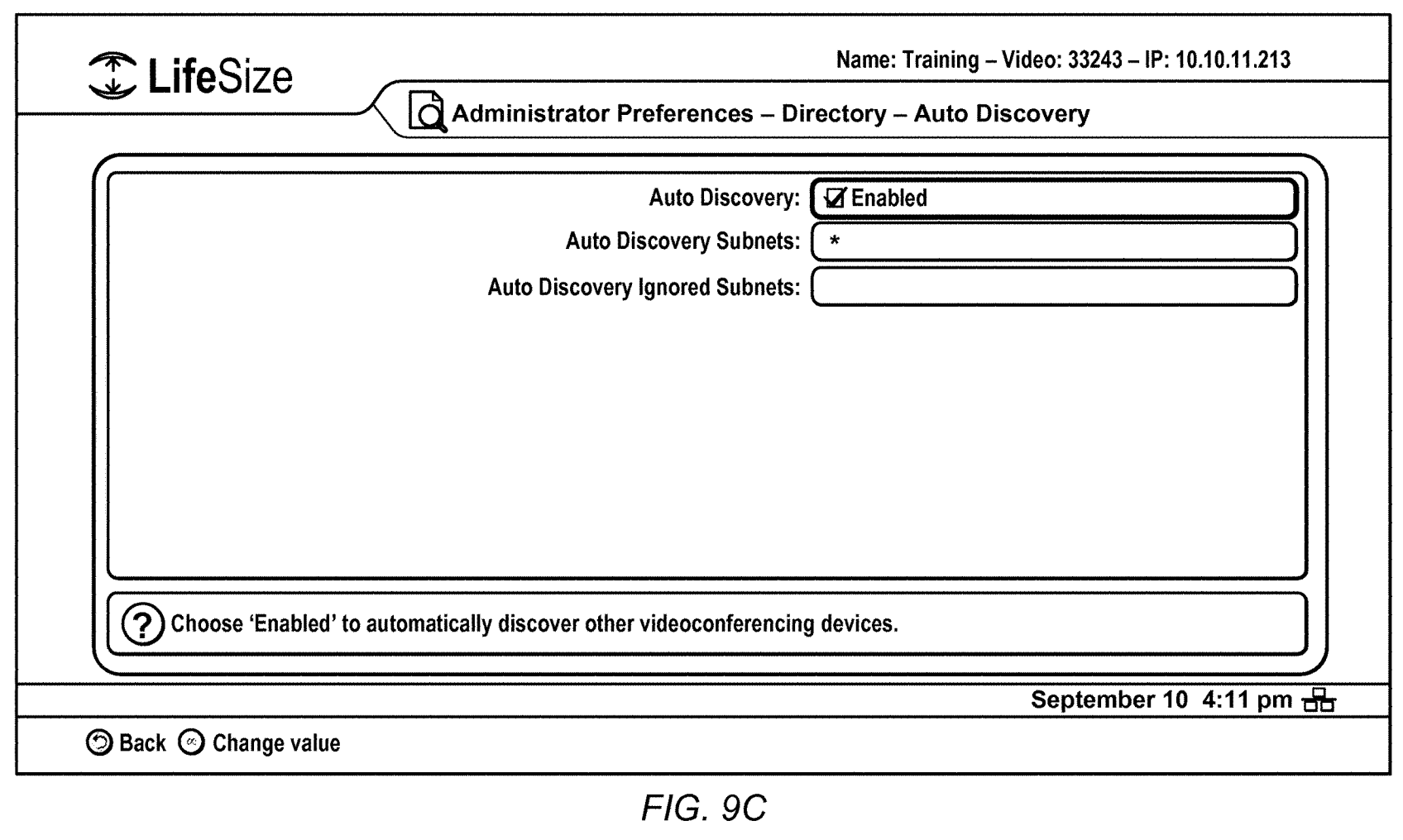
Figure 9D:
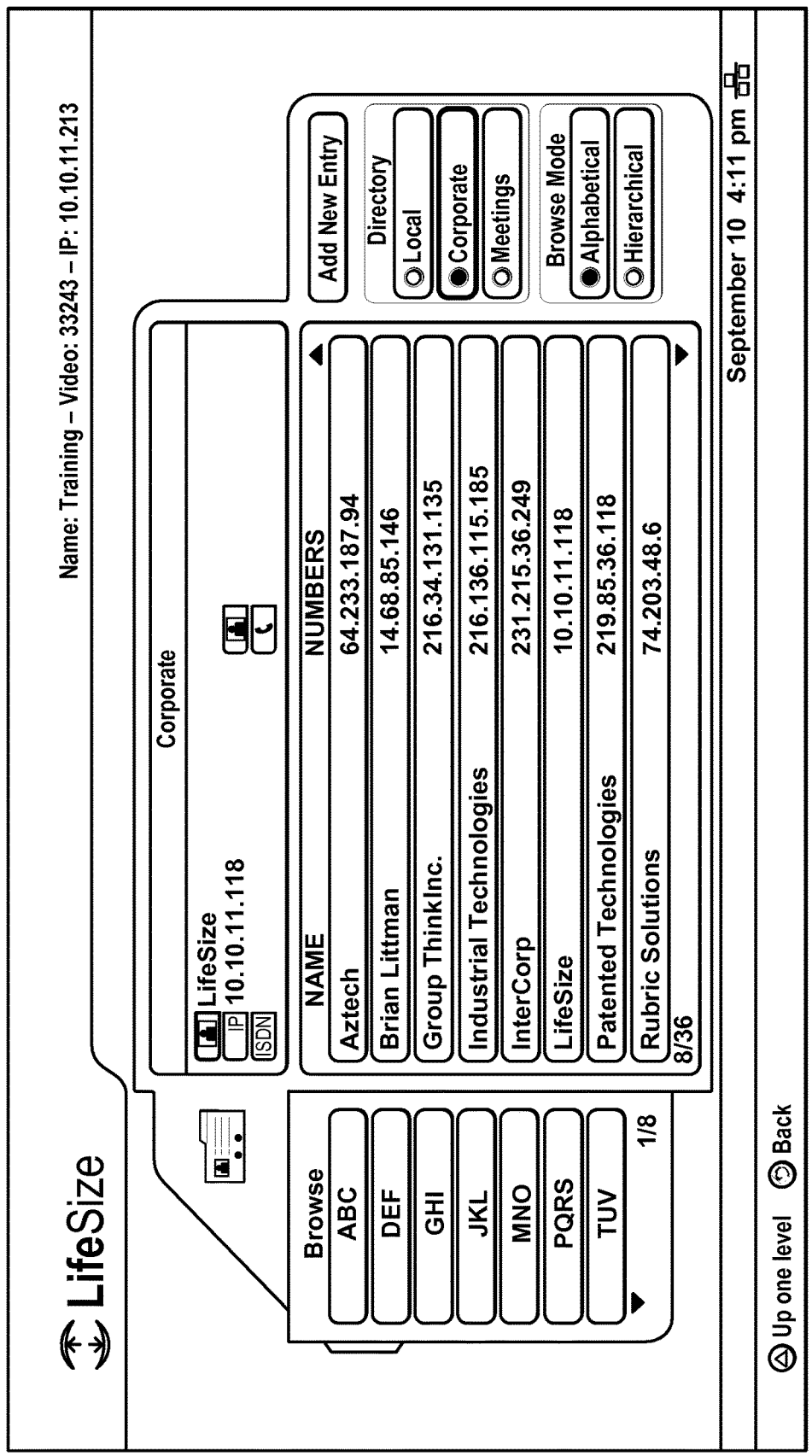

The videoconferencing system 103 may execute various videoconferencing application software that presents a graphical user interface (GUI) on the display 101, e.g., as shown in FIGS. 9B and 9D. The GUI may be used to present an address book, contact list, list of previous callees (call list) and/or other information indicating other videoconferencing systems that the user may desire to call to conduct a videoconference. As noted above, one problem with current videoconferencing systems is that a typical videoconferencing system application has a limited number of contacts in its address book. Also, it is difficult for a user to become aware of the contact information (e.g., calling information) of other videoconferencing endpoints. For example, there is currently no white pages or other centralized directory of videoconferencing endpoint contact information. Embodiments of the invention described herein provide an automatic method of discovering other videoconferencing endpoints, and in particular an automatic method for discovering relevant videoconferencing endpoints, i.e., endpoints that the user will likely desire to call in the future. Thus, in one embodiment, the videoconferencing system 103 may comprise software for performing automatic discovery of other videoconferencing systems (or endpoints) as described herein, and for populating this discovered information into the videoconferencing application address book, contact list, etc.

Figure 2A:
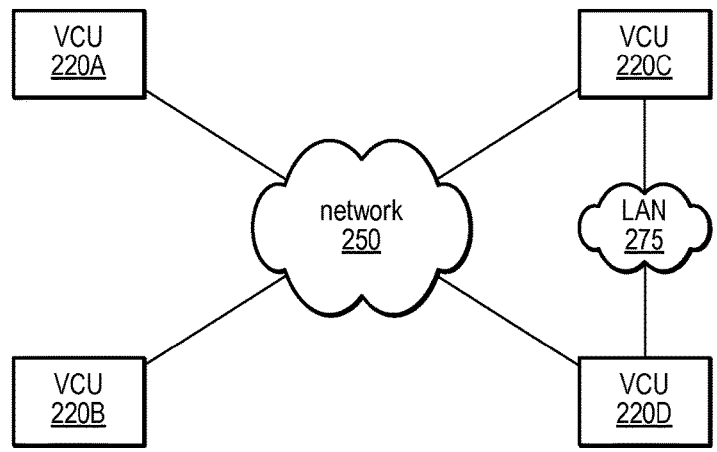
FIGS. 2A and 2B illustrate exemplary videoconferencing systems coupled in different configurations, according to some embodiments.
Figure 2B:
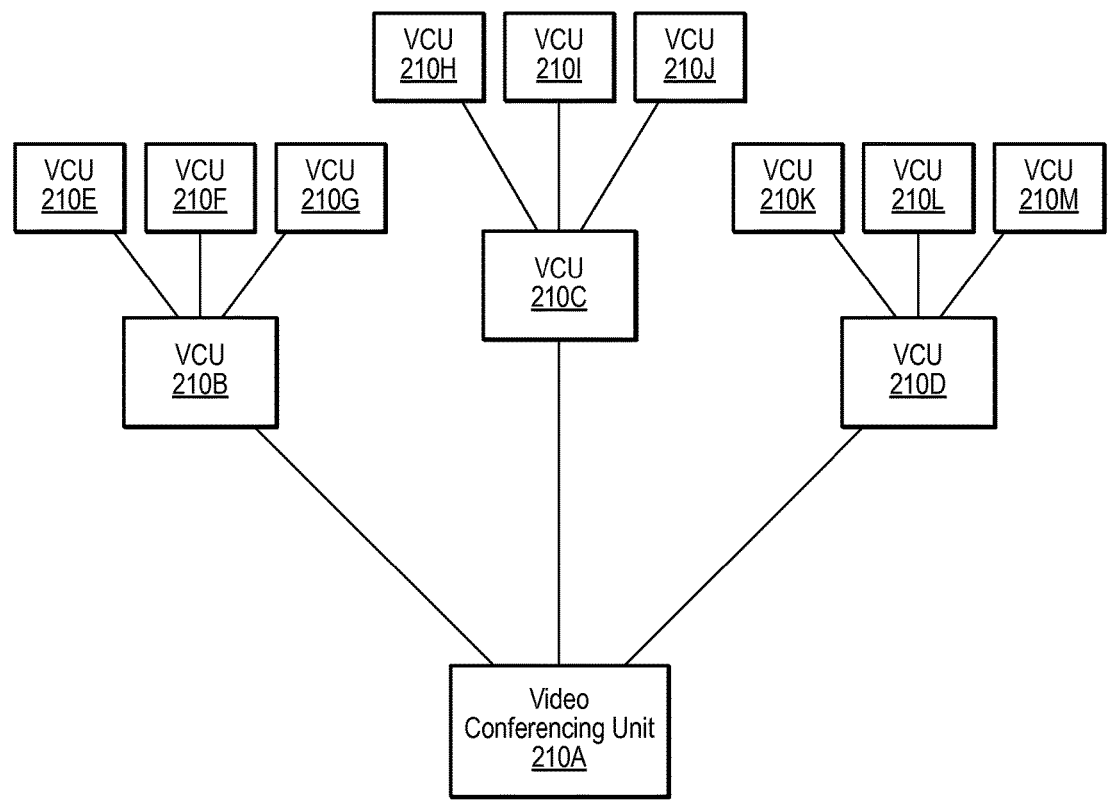

FIGS. 2A and 2B—Coupled Videoconferencing systems

FIGS. 2A and 2B illustrate different configurations of videoconferencing systems. The videoconferencing systems may be operable to perform discovery, e.g., as described in more detail below, e.g., using one or more videoconferencing application(s) stored by the videoconferencing systems. As shown in FIG. 2A, videoconferencing systems (VCUs) 220A-D (e.g., videoconferencing systems 103 described above) may be connected via network 250 (e.g., a wide area network such as the Internet) and VCU 220C and 220D may be coupled over a local area network (LAN) 275. The networks may be any type of network (e.g., wired or wireless) as desired. These videoconferencing systems may discover each other according to embodiments described below, among others.

FIG. 2B illustrates a relationship view of videoconferencing systems 210A-210M. As shown, videoconferencing system 210A may be aware of VCU 210B-210D, each of which may be aware of further VCU's (210E-210G, 210H-210J, and 210K-210M respectively). VCU 210A may be operable to automatically discover one or more of the VCUs 210E-210M according to the methods described herein, among others. In a similar manner, each of the other VCUs shown in FIG. 2b, such as VCU 210H, may be able to automatically discover a subset or all of the other ones of the VCUs shown in FIG. 2b.

Figure 3:
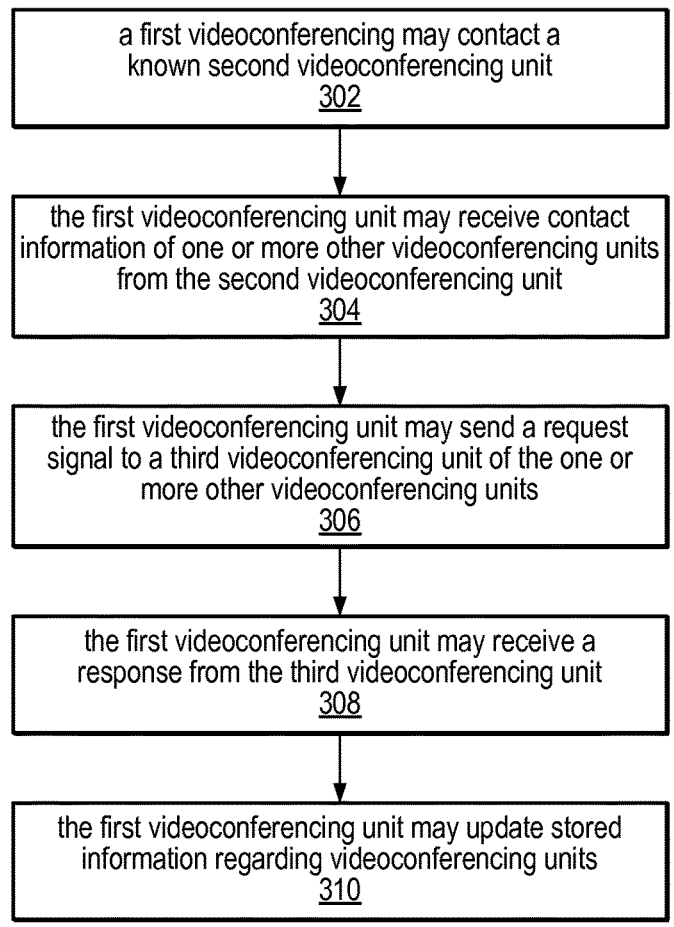
FIGS. 3-8 are flowchart diagrams illustrating exemplary methods related to discovering videoconferencing systems, according to an embodiment.

FIG. 3—Method for Discovering Videoconferencing systems

FIG. 3 illustrates a method for automatically discovering videoconferencing systems. The "automatic" discovery performed herein means that the discovery is performed by the videoconferencing software without any special user input required to initiate the discovery process. It is noted that the user may set various parameters related to the discovery (e.g., how the discovery is performed, when it terminates, etc.), and the discovery would still be "automatic" as defined herein.

The method shown in FIG. 3 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 302, a first videoconferencing system may contact (or send an inquiry to) a known second videoconferencing system or may contact unknown video conferencing systems via a broadcast or multicast signal. The first videoconferencing system may contact the known second videoconferencing host for a variety of reasons. For example, the first videoconferencing system may contact known or discovered videoconferencing systems each time the first videoconferencing system is started. Alternatively, the signal may be sent to the second videoconferencing system based on a timer, or at various intervals to determine a status of the second videoconferencing system. As one example, the first videoconferencing system may be checking or requesting new information based on a timer that may be associated, for example, with each known videoconferencing system, in this case, the second videoconferencing system. In one embodiment, the first videoconferencing system may contact the second videoconferencing system before a 30 minute (or other time length) timer expires for the last time a successful contact occurred with the second videoconferencing system, e.g., to ensure that the second videoconferencing system is still responsive and/or available for videoconferencing.

The first videoconferencing system contacting the known second videoconferencing system may refer to a videoconferencing software application executing on the first videoconferencing system contacting a videoconferencing software application executing on the known second videoconferencing system. As noted above, the first videoconferencing system may contact the second videoconferencing system automatically, e.g., at startup, based on timers, etc., whereby the user does not have to provide direct or manual input to specifically initiate the discovery. For example, a user "turning on" the videoconferencing system, or setting a timer length for the timer described above, does not constitute manually initiating the discovery.

The first videoconferencing system may contact the second video conferencing unit via a variety of methods. In one embodiment, the first videoconferencing system may contact the second videoconferencing system using one or more signals. For example, the first videoconferencing system may contact the second videoconferencing system by sending one or more packets over a local or wide area network (e.g., the Internet). In one embodiment, the first videoconferencing system may send an inquiry (ENQ) packet to the second videoconferencing system. The signal(s)/packet(s) sent to the second videoconferencing system may include various information. For example, the signal(s) may include a station name (e.g., of the first videoconferencing system), information regarding users that use the first videoconferencing system (e.g., names, addresses, locations, phone numbers, email addresses, etc.), information regarding the company name owns or operates the first videoconferencing system (e.g., names, addresses, locations, phone numbers, email addresses, etc.), an IPv4 Address/Mask, an IPv6 Address, a station capability string, a list of known videoconferencing systems (e.g., in the destination subnet and/or otherwise), a list of possible or suspected videoconferencing systems, a list of unresponsive videoconferencing systems, and/or other information.

As indicated, the first videoconferencing system may store information regarding videoconferencing systems. The first videoconferencing system may store a single data structure (a list or database) of information regarding videoconferencing systems, or may store a plurality of separate data structures (lists or databases). For example, the videoconferencing system may store a plurality of lists (data structures) and place videoconferencing systems in the different lists according to various states. In one embodiment, the videoconferencing system may store a list of known or discovered videoconferencing systems, a list of unresponsive videoconferencing systems, a list of "suspects" or possible videoconferencing systems, and/or other lists of videoconferencing systems. The list of known or discovered videoconferencing systems may be used as the address book or may be used to populate a separate address book. Alternatively, or additionally, the videoconferencing system may simply store a single file or database of videoconferencing systems, but may change the state or status of the videoconferencing systems (e.g., as discovered, suspected (or possible), non-responsive, etc.) based on various time intervals, responses, signals, etc. (described in more detail herein). Note that references to storing videoconferencing systems in various ones of the lists may correspond to storing them in a single list or database and changing states in the list (or database), as well as storing them in multiple separate lists. In the example above, the first videoconferencing system may store information regarding the second videoconferencing system in one of the lists, such as the known list, or in another implementation may be stored in a single comprehensive list with a status of "known". As used herein, the term "list" is used to refer generically to a data structure stored in memory of a computer system that stores information regarding videoconferencing systems.

In some embodiments, the stored information regarding other videoconferencing systems may be displayed to the user in a graphical user interface, e.g., of a videoconferencing program executing on the videoconferencing system. In one embodiment, at least some of the stored information may be displayed in an address book. The address book may include recently contacted videoconferencing systems (e.g., the last 1, 2, 3, 5, 10, 15, 20, etc.), intra-corporate contacts (e.g., found in the company's local area network), business contacts (e.g., contacts of the company), personal contacts (e.g., contacts personal to the user of the videoconferencing systems), discovered contacts (e.g., videoconferencing systems found via discovery), possible contacts (e.g., unconfirmed discovered videoconferencing systems), private contacts (e.g., contacts that should not be shared with other videoconferencing systems, e.g., during discovery) and/or other types of contacts. These different categories may be displayed to the user in various organizations (e.g., according to the categories above or other categories, e.g., as defined by the user). In some embodiments, the user may be able to manually sort or configure the address book to personal tastes. Additionally, or alternatively, the videoconferencing program may automatically sort or organize the address book as desired. Updates to the stored information (e.g., in one or more address files or paths) may be displayed in the address book in the videoconferencing application.

Thus, the first videoconferencing system may contact the second videoconferencing systems at various times according to various communication methods.

In 304, the first videoconferencing system may receive contact information (e.g., "hints") of one or more other videoconferencing systems from the second videoconferencing system (e.g., stored in the address book of the second videoconferencing system). In one embodiment, the first videoconferencing system may receive the contact information from the second videoconferencing system in one or more signals or packets from the second videoconferencing system. For example, the second videoconferencing system may respond to the ENQ packet of 302 with an acknowledge (ACK) packet.

The response (e.g., the ACK packet) may include similar information as the ENQ packet described above (except with respect to the second videoconferencing system instead of the first). More specifically, the response may include information regarding addresses of the one or more other videoconferencing systems. These videoconferencing systems may be in and/or outside of the local network of the first and/or second videoconferencing system.

However, it should be noted that the contact information provided by the second videoconferencing system may be filtered, e.g., according to various criteria/settings of the second videoconferencing system. For example, the second videoconferencing system may not send contact information of certain ones of its known or possible videoconferencing systems to the first videoconferencing system based on various criteria. In one embodiment, the criteria may include a privacy flag (e.g., indicating that a particular videoconferencing system's contact information should not be shared to other videoconferencing systems (in this case, the first videoconferencing system)), a whitelist for sharing information (e.g., according to network addresses), a blacklist for not sharing information (e.g., according to network addresses), a criteria to share or not share videoconferencing systems within the same network (e.g., a subnet), a criteria to share or not share videoconferencing systems outside of the local network, and/or other information. In one embodiment, the second videoconferencing system may not provide information and/or respond to the first videoconferencing system unless consent has been given by the operator of the second videoconferencing system and/or the videoconferencing system of which the second videoconferencing system is providing information.

Additionally, the second videoconferencing system may only provide contact information for certain categories or types of contacts. For example, the second videoconferencing system may only share contacts that are corporate instead of personal contacts (or vice versa). In one embodiment the category of contacts to be transferred may be specified (e.g., on a per user basis) by the user(s) of the first and/or second videoconferencing system. For example, user A may choose to only share corporate contacts with user B, but may choose to share all contacts (or other categories) with user C (e.g., using various settings or parameters). However, user A may choose a global preference for sharing contacts (e.g., only share corporate contacts). Alternatively, or additionally, the user of the first videoconferencing system may choose a setting to only retrieve contacts from certain categories (on a global or per user basis, as desired). Such information may be transmitted via the inquiries and response described herein.

In other embodiments, heuristics or intelligent retrieval or provision of contact information may be used (e.g., by the videoconferencing applications executing on the first and/or the second videoconferencing system). For example, contacts may only be retrieved or provided based on information stored and/or obtained by the videoconferencing applications. To achieve this, the videoconferencing application(s) may examine user's communication habits (over a history of use), existing contacts, and/or other information stored on the videoconferencing system. As one specific example, if a user has multiple contacts from a given corporation, it may be likely that he would want more from that company, and contacts may be provided or retrieved accordingly. As another example, if a user has deleted contacts from a certain address repeatedly, contacts may not be retrieved or provided to that user (or the user may be prompted instead of performing retrieval or provision of that particular contact automatically). Thus, the second videoconferencing system may provide contact information for one or more other videoconferencing systems, possibly according to various filters of the second videoconferencing system.

The first videoconferencing system may compare the one or more conferencing units to its own lists of videoconferencing systems. For example, the first videoconferencing system may eliminate or ignore any of the one or more videoconferencing systems that the first videoconferencing system is already aware of. However, for those conferencing units that the first conferencing unit is not aware of, the first videoconferencing system may update stored information. In one embodiment, the first videoconferencing system may add all unknown videoconferencing systems to its possible videoconferencing or "suspects" list. However, as noted above, the first videoconferencing system may filter some of the received videoconferencing systems according to various criteria, such as white or black lists (e.g., of network addresses or subnets, among others), intelligent filtering, categories of contacts, etc.

Additionally, the first videoconferencing system may add all of the videoconferencing systems that are currently unresponsive (as indicated by the second videoconferencing system) to an unresponsive list. In other words, the second videoconferencing system may transmit a list of unresponsive videoconferencing systems (e.g., in addition to its known contacts), and the first videoconferencing systems may move all discovered or known videoconferencing systems that match the unresponsive videoconferencing systems to an unresponsive list. Thus, videoconferencing system information may be updated or stored based on the information transmitted to the first videoconferencing system by the second videoconferencing system. This update may occur at various times, as desired.

In 306, the first videoconferencing system may send a request signal to a third videoconferencing system of the one or more other videoconferencing systems. To send the request, the first videoconferencing system may use the contact information of the third videoconferencing system received in 304. The request signal may be similar to the signal sent by the first videoconferencing system to the second videoconferencing system. For example, the request signal may be one or more ENQ packets. In one embodiment, ENQ packets may be sent to each videoconferencing system in the possible list (including, in this case, the third conferencing unit) periodically for a period of time. For example, ENQ packet(s) may be sent every five seconds for thirty seconds.

In 308, the first videoconferencing system may receive a response from the third videoconferencing system. The response may include information regarding the third videoconferencing system. In one embodiment, the response from the third videoconferencing system may be similar to the response of the second videoconferencing. For example, the third videoconferencing system may respond with information (e.g., in ACK packet(s)) similar to the information described above (e.g., addresses, capabilities, contact information, user information, etc.). Thus, the third videoconferencing may respond to the request from the first videoconferencing system.

In 310, the first videoconferencing system may update stored information regarding videoconferencing systems. For example, where the third videoconferencing system responds (e.g., within a predetermined length of time, such as, for example, 30 minutes), the first videoconferencing system may store the third videoconferencing system (e.g., information regarding the third videoconferencing system) in a discovered or known videoconferencing systems list. Correspondingly, the third videoconferencing system may be removed from an unresponsive or possible ("suspected") list. Thus, the first videoconferencing system may discover (or automatically discover as desired) the third videoconferencing system by contacting a known videoconferencing system (in this case the second videoconferencing system). However, where the third videoconferencing system does not respond, the third videoconferencing system may be added to an unresponsive list and/or other videoconferencing systems may be notified of the third videoconferencing system's unresponsive state.

The same method may apply to other known and possible contacts. For example, the first videoconferencing system may contact other known videoconferencing systems (possibly the third videoconferencing system after discovering it) and those videoconferencing systems may supply more videoconferencing systems for discovery. The first videoconferencing system may then contact any of the possible videoconferencing systems according to 306 and 308 above, among other methods.

However, in some embodiments, the user may be able to specify how many degrees of separation (or what depth) to retrieve further contacts. For example, the user may only wish to identify friends of friends (e.g., for personal videoconferencing) or contacts of contacts (e.g., for corporate relationships) rather than discovering all the videoconferencing units available. Such embodiments may help avoid situations where the user's address book is suddenly filled with contacts the user does not desire to contact after performing the automatic discovery. The user may choose other settings, e.g., to only retrieve contacts recently contacted. For example, the user may wish to only receive contacts whom have been contacted (or performed a videoconference) in the last 30 days, 3 months, 6 months, or any other desired time period. As noted above, the user may black or white list addresses, companies, or other categories of contacts (e.g., filtering may be performed by keywords on any of the possible fields of a contact). Additionally, the user may choose settings to only retrieve or provide contacts in certain categories on a per user or global basis. Note that not all discovered videoconferencing systems may be stored in the address book of the user. Correspondingly, the user may control how videoconferencing systems are discovered and/or how they are stored to the address book. Thus, the user may control how contacts are automatically discovered and/or stored in the address book of the videoconferencing unit.

Furthermore, the user may modify or update the stored information. In one embodiment, the user may organize contacts (e.g., moving or categorizing new contacts) displayed in the address book shown on the display of the first videoconferencing system. However, such organization may not be necessary as the first videoconferencing system may automatically sort and/or categorize the discovered/possible videoconferencing systems. Accordingly, the stored information may be updated. Thus, the address book may be displayed before other videoconferencing systems are discovered (e.g., with a first plurality of videoconferencing systems) and then displayed after other videoconferencing systems are discovered (e.g., with a second plurality of videoconferencing systems, at least including some of the discovered videoconferencing untis).

Thus, FIG. 3 illustrates an exemplary embodiment for discovering (or automatically discovering) videoconferencing systems. The method may be performed automatically and periodically to discover other videoconferencing systems (e.g., the third videoconferencing system may be queried to retrieve fourth videoconferencing systems). However, it should be noted that in some embodiments, care may be taken (e.g., by the videoconferencing systems) to ensure that no private information is passed or transmitted. The following flowcharts describe more specific embodiments of discovery and updating processes of the videoconferencing systems. Note that any of these methods may be incorporated for the discovery process (and any descriptions related to FIG. 3 may also apply to these Figures).

Figure 4:
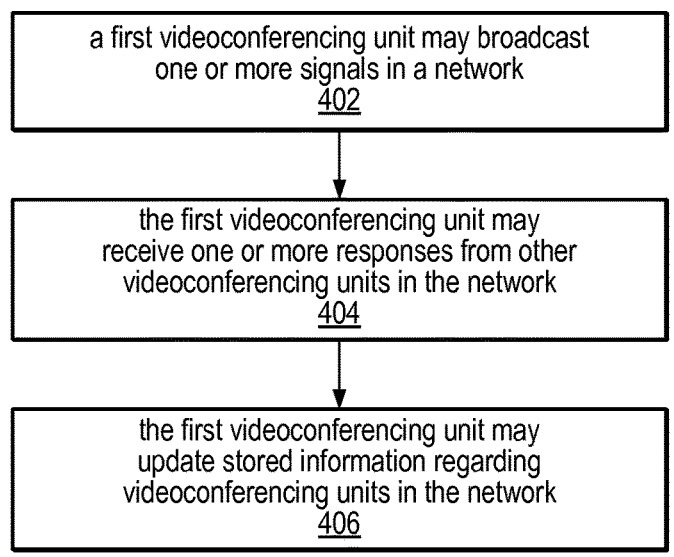

FIG. 4—Broadcast Discovery

FIG. 4 illustrates a method for discovering videoconferencing systems using a broadcast or multicast method. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a first videoconferencing system may broadcast/multcast one or more signals (e.g., inquiries) in/to a network. In one embodiment, the first videoconferencing system may only broadcast the one or more signals in a local network, e.g., within a subnet. For example, the first videoconferencing system may only contact or send signals (e.g., for privacy/security reasons) to videoconferencing systems within a corporate or local area network as opposed to a wide area network such as the Internet. In one embodiment, the signals broadcasted by the first videoconferencing system in 402 may be similar to the ENQ packet(s) described above in FIG. 3.

The first videoconferencing system may send out the one or more signals at various times, as desired. In one embodiment, the first videoconferencing system may broadcast the one or more signals at five second intervals, e.g., once every five seconds for 25 seconds at startup, as one example. For example, the first videoconferencing system may send out these signals at each start up to renew and/or update stored information regarding videoconferencing systems. As described above, the stored information regarding videoconferencing systems may be stored in one or more files or paths and/or may be in a database of contacts. Each videoconferencing system may have a status, or category (e.g., responsive, unresponsive, business, personal, private, public, etc.). Additionally, at least a portion of the videoconferencing system information may be displayed to the user in a graphical user interface, e.g., of a videoconferencing application executing on the first videoconferencing system.

In 404, the first videoconferencing system may receive one or more responses from other videoconferencing systems in the network. Similar to above, the one or more responses may include various information regarding the other videoconferencing systems and/or contact information of other videoconferencing systems (e.g., outside of the local area network). The response may not include information regarding local area network videoconferencing systems as it may be assumed that the first videoconferencing system has/can automatically discover the local videoconferencing systems, e.g., using the method described in this Figure or others.

In 406, the first videoconferencing system may update stored information regarding videoconferencing systems in the network. For example, the first videoconferencing system may store each of the videoconferencing systems that responded to the one or more signals of 402 in a discovered or corporate list. Additionally, the first videoconferencing system may store any wide area network videoconferencing systems (e.g., the ones provided in the responses by the local videoconferencing systems) in a discovered or possible list. The first videoconferencing systems may then contact these videoconferencing systems using various ones of the methods described herein (and accordingly, the stored information may be updated with contact information retrieved from the videoconferencing systems). Thus, the first videoconferencing system may update stored information (and/or the address book displayed to the user) regarding other videoconferencing systems. Additionally, the user may sort, organize, and/or otherwise modify the address book according to personal preferences.

These discovered videoconferencing systems may be contacted to perform videoconference(s) using the videoconferencing application(s) stored by the first videoconferencing system, e.g., after verification of the discovered videoconferencing systems.

Figure 5:
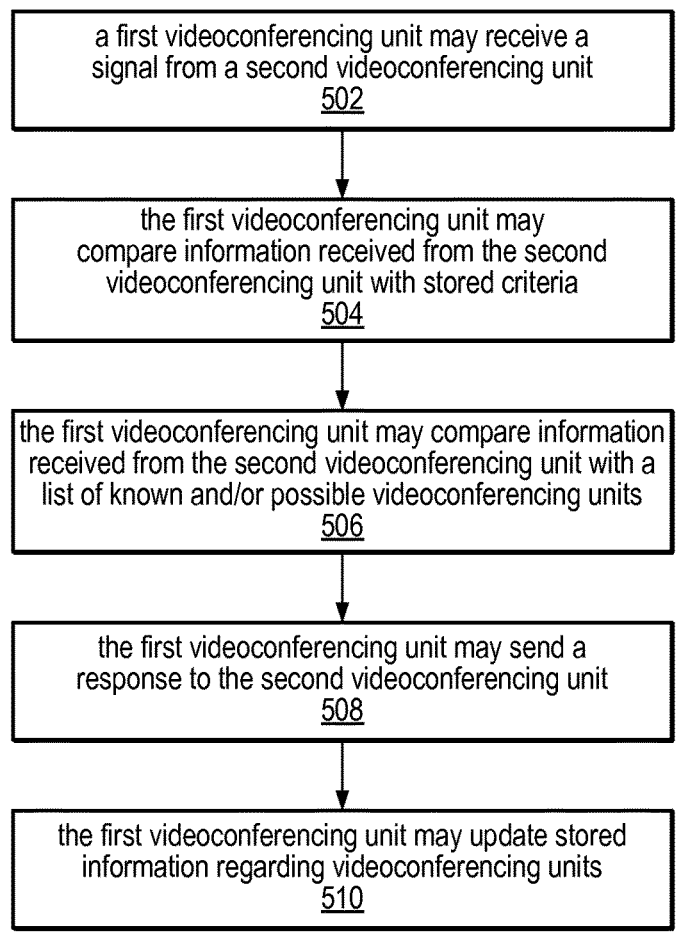

FIG. 5—Discovery Response

FIG. 5 illustrates a method for responding to a discovery signal. The method shown in FIG. 5 may be used in conjunction with any of the computer systems or devices shown in the above Figures, among other devices. For example, the method of FIG. 5 may apply to the second videoconferencing system response described above in FIG. 3. In various embodiments, some of the method elements shown may be performed concurrently, performed in a different order than shown, or omitted. Additional method elements may also be performed as desired. As shown, this method may operate as follows.

In 502, a first videoconferencing system (e.g., a videoconferencing application executing on the first videoconferencing system) may receive one or more signals or inquiries from a second videoconferencing system. The inquiry from the second videoconferencing system may be similar to the inquiry transmitted by the first videoconferencing system described in 302 above.

In 504, the first videoconferencing system may compare information received from the second videoconferencing system with stored criteria. For example, the first videoconferencing system may filter the received information according to various criteria. In one embodiment, where the received information includes lists of known videoconferencing systems, discovered videoconferencing systems, unresponsive videoconferencing systems, local or remote videoconferencing systems, etc., the first videoconferencing system may compare address information (or other information) with white or black lists for filtering purposes. For example, the first videoconferencing system may filter out any videoconferencing systems that have a certain IP address or are in a certain subnet (e.g., 192.168.*.*). Alternatively, or additionally, the videoconferencing system may only accept information from certain IP addresses, or that match other information (e.g., from certain companies, from a specified contact address (email, physical, etc.), and/or other information). Thus, the first videoconferencing system may filter information received from the second videoconferencing system using criteria. Note that the criteria may be specified by the user or from other sources, as desired.

In 506, the first videoconferencing system may compare information received from the second videoconferencing system with a list of known and/or possible videoconferencing systems. As indicated above, the inquiry from the second videoconferencing system may include information regarding other videoconferencing systems (e.g., addresses, contact information, user information, etc.). Accordingly, the first videoconferencing system may compare different types of information of other videoconferencing systems with its own stored information of videoconferencing systems.

As one example, the first videoconferencing system may compare its known videoconferencing system with the received information regarding videoconferencing systems and add any new ones to a discovered or possible list. Additionally, or alternatively, the first videoconferencing system may compare its known or discovered videoconferencing system with unresponsive videoconferencing systems received from the second videoconferencing system. Any matches may be moved from their previous list (e.g., discovered, known, etc.) to the unresponsive list. Thus, the first videoconferencing system may update its information according to the signals/inquiries received from the second videoconferencing system.

In 508, the first videoconferencing system may send a response to the second videoconferencing system. The response may be sent to the second videoconferencing system indicating stored information of the first videoconferencing system. For example, the first videoconferencing system may provide the second videoconferencing system (e.g., according to the embodiments described above in FIG. 3) with information regarding its own known contacts, unresponsive contacts, discovered contact, further contact information, user information, etc. As indicated above, the first videoconferencing system may filter the provided information to the second videoconferencing system according to various criteria (e.g., privacy indications from the user or other videoconferencing systems, black lists, white lists, etc.).

As indicated above, in 510, the first videoconferencing system may update stored information regarding videoconferencing systems. Updating the stored information may occur at various points in the method, as desired.

Figure 6:
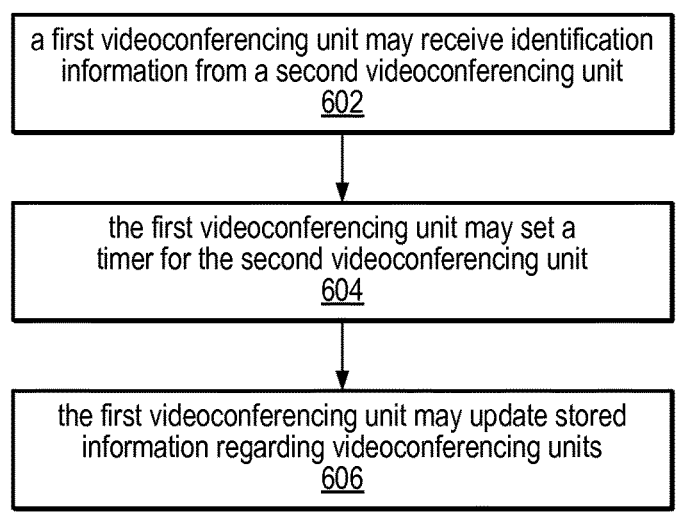

FIG. 6—Possible Contacts

FIG. 6 illustrates a method for discovering videoconferencing systems. The method shown in FIG. 6 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 602, a first videoconferencing system may receive identification information and/or contact information (e.g., in an inquiry or response) from a second videoconferencing system. The received information may be similar to those inquiries and/or responses described above. For example, the first videoconferencing system may receive information regarding other videoconferencing systems from the second videoconferencing system. In one embodiment, the information received from the second videoconferencing system may validate the responsiveness of the second videoconferencing system.

In 604, the first videoconferencing system may set a timer for the second videoconferencing system. For example, the first videoconferencing system may attempt to verify that the second videoconferencing system is still responsive and/or able to perform videoconferencing after a certain time length. In one embodiment, the timer may be 30 minutes; however, other lengths of time are envisioned, e.g., 10 minutes, 5 minutes, 1 hour, 3 hours, 24 hours, 48 hours, every week, etc. Thus, various time lengths are envisioned. In one embodiment, the user may turn on or off and/or set the time length for checking responsiveness of videoconferencing systems. Thus, the timer may be customizable by the user.

After expiration of the timer, the first videoconferencing system may send an inquiry (such as those described above, among others) the second videoconferencing system, e.g., to verify its responsiveness. Accordingly, the second videoconferencing may or may not reply with a response to the inquiry (similar to those described above, among others).

In 606, the first videoconferencing system may update stored information regarding videoconferencing systems. For example, where the second videoconferencing system responds, the first videoconferencing system may reset the timer and/or add further contacts to the stored information (e.g., as received from the second videoconferencing system in the response). In one embodiment, the second videoconferencing system may contact the first videoconferencing system before the first videoconferencing system sends an inquiry to the second videoconferencing system. In these instances, the first videoconferencing system may reset the timer as the presence of the second videoconferencing system has been verified.

Additionally, where the second videoconferencing system does not respond, the first videoconferencing system may remove the second videoconferencing system from the discovered or known list and add it to the unresponsive list. Additionally, the first videoconferencing system may alert other videoconferencing systems of the unresponsive state of the second videoconferencing system.

Figure 7:
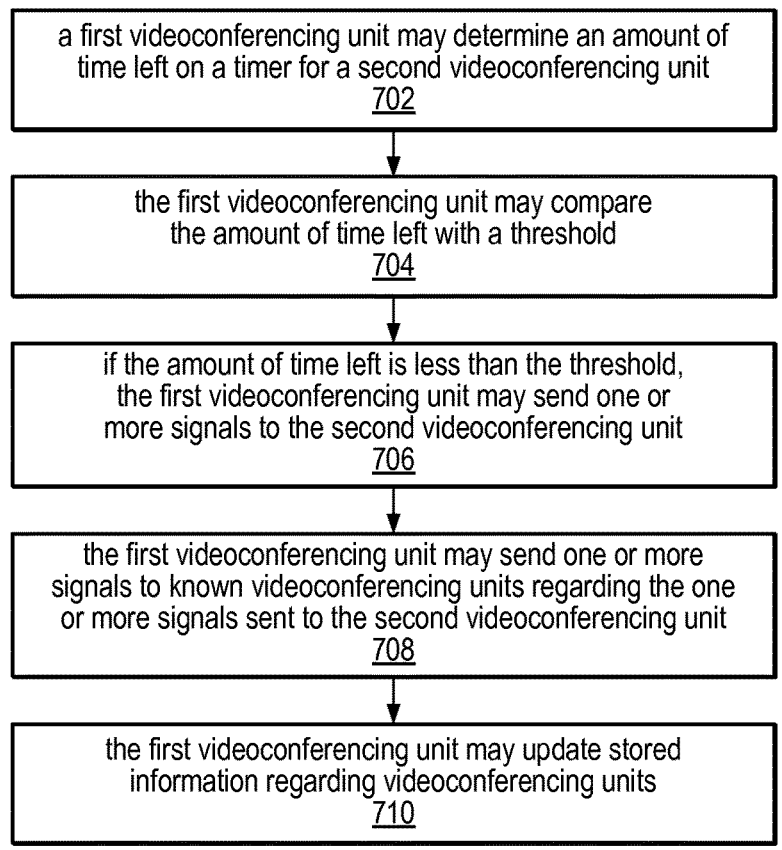

FIG. 7—Timer for Discovered Videoconferencing systems

FIG. 7 illustrates a method for discovering videoconferencing systems. The method shown in FIG. 7 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 702, a first videoconferencing system may determine an amount of time left on a timer for a second videoconferencing system. As indicated above, the first videoconferencing system may store and update a timer (e.g., according to a certain granularity, such as five seconds) for other videoconferencing system(s). In one embodiment, the first videoconferencing system may keep track of a timer for each videoconferencing system (known and/or discovered, among others) or may keep track of a timer for subgroups or all of the videoconferencing systems.

In 704, the first videoconferencing system may compare the amount of time left with a threshold. As indicated above, the threshold time may be 30 minutes, among a variety of other alternatives. In one embodiment, the first videoconferencing system may use a second threshold as well. For example, the first threshold may be 30 minutes, but the second threshold may be 25 seconds. The second threshold may be used as a threshold (subtracted from the first threshold) to begin sending packets to the second videoconferencing system. Alternatively, the first threshold could simply be changed to the value of the first threshold—the second threshold (in this case, 29 minutes, 35 seconds).

In 706, if the amount of time left is less than the threshold, the first videoconferencing system may send one or more signals to the second videoconferencing system. For example, the first videoconferencing system may send signals to the second videoconferencing system after, following the example above, 30 minutes is reached. Alternatively, the first videoconferencing system may start sending signals when the first threshold—the second threshold is reached (in this case, 29 minutes 35 seconds), and may send signals until the first threshold is reached (e.g., every 5 seconds) or until the second videoconferencing system responds. Other thresholds and periods for sending inquiries or envisioned.

Thus, the first videoconferencing system may check the responsiveness and/or ability to perform videoconferencing of the second videoconferencing system if the time is less than the threshold.

In 708, the first videoconferencing system may send one or more signals to known videoconferencing systems regarding the one or more signals sent to the second videoconferencing system. For example, if the second videoconferencing system does not respond, the first videoconferencing system may alert other videoconferencing systems of the unresponsive state of the second videoconferencing system.

Figure 8:
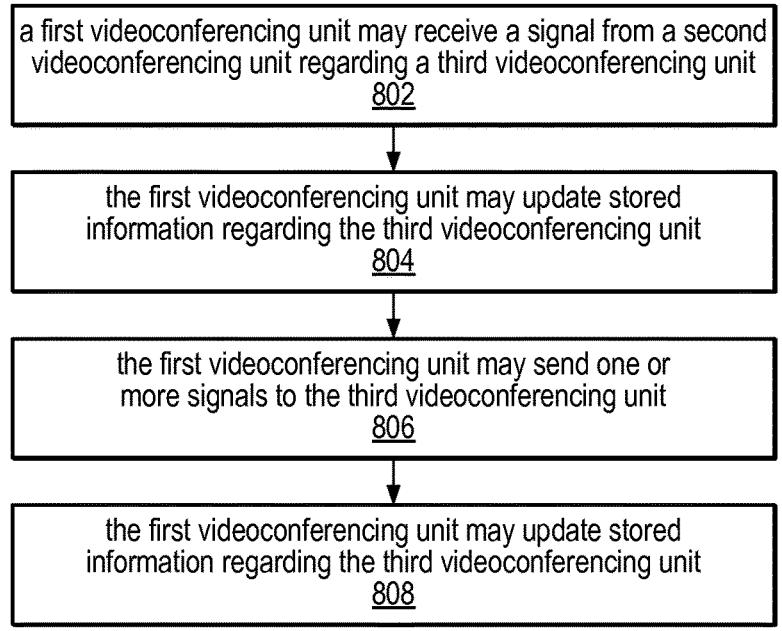

In 710, the first videoconferencing system may update stored information regarding videoconferencing systems. For example, the first videoconferencing system may FIG. 8—Unresponsive Contacts FIG. 8 illustrates a method for discovering videoconferencing systems. The method shown in FIG. 8 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 802, a first videoconferencing system may receive a signal from a second videoconferencing system regarding a third videoconferencing system. The signal from the second videoconferencing system may indicate that the third videoconferencing system is unresponsive.

In 804, the first videoconferencing system may update stored information regarding the third videoconferencing system. For example, the first videoconferencing system may place the third videoconferencing system in a state that requires it to be verified within a timeout period (e.g. 25 seconds) or it may be moved to an unresponsive list.

In 806, the first videoconferencing system may send one or more signals to the third videoconferencing system. In one embodiment, the first videoconferencing system may send inquiries to the third videoconferencing system for the remainder of the timer (e.g., every five seconds for 25 seconds).

In 808, the first videoconferencing system may update stored information regarding the third videoconferencing system. If the third videoconferencing system does not respond, the third videoconferencing system may be moved to the unresponsive list and/or other systems may be notified of its unresponsive state. However, if the third videoconferencing system does respond, it may remain on a discovered or known list, and other videoconferencing systems may be notified of its responsive state.

FIGS. 9A-9B—Exemplary Screen Shots

FIGS. 9A-9B illustrate exemplary screen shots of a graphical user interface of a videoconferencing application executing on a videoconferencing system. More specifically, the screenshots illustrate a walk through of a discovery process and a list of discovered videoconferencing systems, using embodiments of the methods described above. These screen shots are exemplary only and other steps, wizards, graphical user interfaces, windows, processes, etc. are envisioned.

As shown in FIG. 9A, the autodiscovery option in the administrative preferences is disabled. As indicated in the Figure, the user may choose 'enabled' to automatically discover other videoconferencing devices.

FIG. 9B illustrates the corporate contacts of the videoconferencing system (one embodiment of the address book described above). As shown, no videoconferencing systems are displayed in the address book (under the category "contacts") before the discovery option is turned on. As also shown, the address book may have several directory listings, e.g., local, corporate, meetings, etc. Additionally, the user may browse through the contacts using an alphabetical browse mode or a hierarchical browse mode. The user may also select categories of letters to automatically jump to those contacts using the buttons on the left hand side ('ABC', 'DEF', 'GHI', 'JKL', 'MNO', 'PQRS', 'TUV', etc.). The listing may include name and numbers of the contacts, and selected contacts may show in the top portion, where a photo and contact information may be displayed next to the person icon, an IP address may be displayed next to the IP icon, an ISDN may be displayed next to the ISDN icon, a phone number may be displayed next to the phone icon, and other contact information of the user may be displayed next to the figure icon.

FIG. 9C illustrates the autodiscovery option turned on from FIG. 9A.

FIG. 9D illustrates a populated address book after autodiscovery is performed (e.g., according to the methods described above, among others). As shown, the first local area network contact "LifeSize" with IP address "10.10.11.118" is selected and shown in the top portion. Other contacts (8 of 36) were discovered in the autodiscovery process. As shown, the address book now includes corporate contacts "Aztech" with IP address "64.233.187.94", "InterCorp" with IP address "231.215.36.249", "Rubric Solutions" with IP address "74.203.48.6", "Industrial Technologies" with IP address "216.136.115.185", "Group Think Inc." with IP address "216.34.131.135", "Brian Littman" with IP address "14.68.85.146", and "Patented Technologies" with IP address "219.85.36.118".

Thus, FIGS. 9A-9B illustrate one embodiment of an exemplary address book before and after the discovery process described herein.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for determining contact information of videoconferencing endpoints, the method comprising:
   a first videoconferencing endpoint sending a first inquiry to a videoconferencing application of a known second videoconferencing endpoint, wherein the second videoconferencing endpoint stores videoconferencing contact information of one or more third videoconferencing endpoints, wherein at least a subset of the contact information of the one or more third videoconferencing endpoints are unknown to the first videoconferencing endpoint, wherein the contact information comprises internet protocol (IP) addresses for the one or more third videoconferencing endpoints, and wherein each endpoint comprises a camera, microphone, display device, and speakers for enabling a videoconference participant to participate in a videoconference;
   the first videoconferencing endpoint receiving and storing the IP addresses of the one or more third videoconferencing endpoints from the second videoconferencing endpoint;
   the first videoconferencing endpoint sending a second inquiry to at least one of the one or more third videoconferencing endpoints;
   wherein the first videoconferencing endpoint stores a list of unresponsive videoconferencing endpoints, wherein if the first videoconferencing endpoint does not receive a response from the at least one of the one or more third videoconferencing endpoints within a predetermined length of time, the method further comprises:
   storing each unresponsive third videoconferencing endpoint in the list of unresponsive videoconferencing endpoints;
   wherein the first videoconferencing endpoint is operable to establish communication with each of the one or more third videoconferencing endpoints based upon the IP addresses received from the second videoconferencing endpoint.

2. The method of claim 1, further comprising:
   the first videoconferencing endpoint displaying a graphical user interface with a first one or more videoconferencing contacts prior to sending the first inquiry;
   the first videoconferencing endpoint displaying the graphical user interface with a second plurality of videoconferencing contacts after receiving and storing the videoconferencing contact information, wherein the second plurality of videoconferencing contacts includes at least one of the one or more third videoconferencing endpoints.

3. The method of claim 1, further comprising:
   the first videoconferencing endpoint receiving a response from the third videoconferencing endpoint, wherein the response comprises information regarding the third videoconferencing endpoint.

4. The method of claim 3, wherein the response from the third videoconferencing endpoint comprises videoconferencing contact information of one or more fourth videoconferencing endpoints, wherein the contact information of the one or more fourth videoconferencing endpoints comprises IP addresses for the one or more fourth videoconferencing endpoints;
   wherein the first videoconferencing endpoint is operable to establish communication with each of the one or more fourth videoconferencing endpoints using the IP addresses of the one or more fourth videoconferencing endpoints.

5. The method of claim 1, further comprising:
   the first videoconferencing endpoint transmitting a signal to one or more videoconferencing endpoints in a local network one or more times, wherein the signal indicates contact information of the first videoconferencing endpoint.

6. The method of claim 5, further comprising:
   the first videoconferencing endpoint receiving responses from at least a subset of the one or more videoconferencing endpoints; and
   the first videoconferencing endpoint storing information regarding the at least a subset of the one or more videoconferencing endpoints.

7. The method of claim 1, wherein the first videoconferencing endpoint stores a list of known videoconferencing endpoints, wherein the second videoconferencing endpoint is comprised in the list of known videoconferencing endpoints.

8. The method of claim 1, wherein the first videoconferencing endpoint stores a list of possible videoconferencing endpoints, wherein after the first videoconferencing endpoint receives the contact information of the one or more third videoconferencing endpoints from the second videoconferencing endpoint, the method further comprises:
   storing the contact information of at least one of the one or more third videoconferencing endpoints in the list of possible videoconferencing endpoints.

9. The method of claim 8, further comprising:
   the first videoconferencing endpoint sending a third inquiry to the at least one of the one or more third videoconferencing endpoints;
   the first videoconferencing endpoint receiving a response from the at least one of the one or more third videoconferencing endpoints;

the first videoconferencing removing the at least one of the one or more third videoconferencing endpoints from the list of possible videoconferencing endpoints; and the first videoconferencing endpoint storing the at least one of the one or more third videoconferencing endpoints in a list of known videoconferencing endpoints.

10. The method of claim 1, wherein the first videoconferencing endpoint stores information regarding contact information of videoconferencing endpoints, and wherein the method further comprises:

the first videoconferencing endpoint comparing the contact information of the one or more third videoconferencing endpoints with the information regarding contact information of videoconferencing endpoints;

wherein the first videoconferencing endpoint is operable to communicate with each of the one or more third videoconferencing endpoints based on the first videoconferencing endpoint comparing the contact information.

11. The method of claim 10, wherein the information regarding the contact information of videoconferencing endpoints comprises a white list of addresses.

12. The method of claim 10, wherein the information regarding the contact information of videoconferencing endpoints comprises a black list of addresses.

13. The method of claim 1, further comprising:

the first videoconferencing endpoint sending signals to known videoconferencing endpoints;

the first videoconferencing endpoint receiving responses from one or more of the known videoconferencing endpoints; and for each videoconferencing endpoint that a response is not received from within a predetermined length of time:
  removing the videoconferencing endpoint from a list of known videoconferencing endpoints; and
  storing the videoconferencing endpoint in a list of unresponsive videoconferencing endpoints.

14. The method of claim 1, further comprising:

the first videoconferencing endpoint sending one or more first signals to known or possible videoconferencing endpoints; and the first videoconferencing endpoint sending one or more second signals to known videoconferencing endpoints indicating each of the videoconferencing endpoints that a response was not received from within a predetermined length of time.

15. The method of claim 1, further comprising:

the first videoconferencing endpoint sending signals to unresponsive videoconferencing endpoints;

the first videoconferencing endpoint receiving responses from one or more of the unresponsive videoconferencing endpoints; and for each of the responses:
  removing the corresponding videoconferencing endpoint from a list of unresponsive videoconferencing endpoints; and
  storing the corresponding videoconferencing endpoint in a list of known videoconferencing endpoints.

16. A method for discovering videoconferencing endpoints comprising:

a first videoconferencing endpoint sending an inquiry to a known second videoconferencing endpoint;

the first videoconferencing endpoint receiving contact information of one or more other videoconferencing endpoints from the second videoconferencing endpoint, wherein at least a subset of the contact information of the one or more other videoconferencing endpoints are unknown to the first videoconferencing endpoint, wherein the contact information comprises internet protocol (IP) addresses for the one or more other videoconferencing endpoints, and wherein each endpoint comprises a camera, microphone, display device, and speakers for enabling a videoconference participant to participate in a videoconference; and the first videoconferencing endpoint recursively retrieving, via the one or more other videoconferencing endpoints, IP addresses of one or more additional videoconferencing endpoints, subject to a user-specified limitation on a number of degrees of separation between the first videoconferencing endpoint and the one or more additional videoconferencing endpoints.

17. The method of claim 16, further comprising:

the first videoconferencing endpoint sending a second inquiry to each of the one or more other videoconferencing endpoints using the IP addresses of the one or more other videoconferencing endpoints;

the first videoconferencing endpoint receiving and storing additional contact information from at least one of the one or more other videoconferencing endpoints.

18. The method of claim 16, further comprising:

the first videoconferencing endpoint sending a second inquiry to each of the one or more other videoconferencing endpoints using the IP addresses of the one or more other videoconferencing endpoints;

the first videoconferencing endpoint monitoring responses received from the one or more other videoconferencing endpoints to determine availability of respective ones of the one or more other videoconferencing endpoints.

19. A non-transitory computer-accessible memory medium comprising program instructions for determining contact information of videoconferencing endpoints, wherein the program instructions are executable by a processor of a first videoconferencing endpoint to:

send a first inquiry to a videoconferencing application of a known second videoconferencing endpoint, wherein the second videoconferencing endpoint stores videoconferencing contact information of one or more third videoconferencing endpoints that is unknown to the first videoconferencing endpoint, wherein the contact information comprises internet protocol (IP) addresses of the one or more third videoconferencing endpoints, and wherein each endpoint comprises a camera, microphone, display device, and speakers for enabling a videoconference participant to participate in a videoconference;

receive and store the IP addresses of the one or more third videoconferencing endpoints from the second videoconferencing endpoint;

initiate communication with each of the one or more third videoconferencing endpoints using the IP addresses of the one or more third videoconferencing endpoints;

send a second inquiry to at least one of the one or more third videoconferencing endpoints; and if the first videoconferencing endpoint does not receive a response from the at least one of the one or more third videoconferencing endpoints within a predetermined length of time, store each unresponsive third videoconferencing endpoint in a list of unresponsive videoconferencing endpoints.

20. The non-transitory computer-accessible memory medium of claim 19, wherein the program instructions are further executable to:

display a graphical user interface with a first one or more videoconferencing contacts prior to sending the first inquiry;

display the graphical user interface with a second plurality of videoconferencing contacts after receiving and storing the videoconferencing contact information, wherein the second plurality of videoconferencing contacts includes at least one of the one or more third videoconferencing endpoints.

21. The non-transitory computer-accessible memory medium of claim 19, wherein the program instructions are further executable to:

receive a response from a third videoconferencing endpoint, wherein the response from the third videoconferencing endpoint comprises videoconferencing contact information of one or more fourth videoconferencing endpoints, wherein the contact information of the one or more fourth videoconferencing endpoints comprises IP addresses of the one or more third videoconferencing endpoints; and initiate communication with each of the one or more fourth videoconferencing endpoints based upon the IP addresses of the one or more fourth videoconferencing endpoints.

22. The non-transitory computer-accessible memory medium of claim 19, wherein the program instructions are further executable to:

update stored information regarding videoconferencing endpoints.

23. The non-transitory computer-accessible memory medium of claim 22, wherein the stored information regarding videoconferencing endpoints comprises an address book, and wherein the address book is usable to invoke videoconferencing with one or more of the videoconferencing endpoints.

24. The method of claim 1, further comprising:

the first videoconferencing endpoint recursively retrieving, via the one or more third videoconferencing endpoints, IP addresses of one or more additional videoconferencing endpoints, subject to a user-specified limitation on a number of degrees of separation between the first videoconferencing endpoint and the one or more additional videoconferencing endpoints.

25. The non-transitory computer-accessible memory medium of claim 19, wherein the program instructions are further executable to:

recursively retrieve, via the one or more third videoconferencing endpoints, IP addresses of one or more additional videoconferencing endpoints, subject to a user-specified limitation on a number of degrees of separation between the first videoconferencing endpoint and the one or more additional videoconferencing endpoints.

* * * * *